United States Patent [19]
Lanfrey

[11] Patent Number: 5,217,404
[45] Date of Patent: Jun. 8, 1993

[54] PROCESS FOR THE CALIBRATION, LENGTH MEASUREMENT AND PACKAGING OF PORTIONS OF INTESTINE USED IN PORK BUTCHERY AND APPARATUS FOR CARRYING IT OUT

[75] Inventor: Christian B. Lanfrey, Aspres sur Buech, France

[73] Assignee: Boyauderie des Alpes, France

[21] Appl. No.: 499,499

[22] PCT Filed: Nov. 7, 1989

[86] PCT No.: PCT/FR89/00576
§ 371 Date: Sep. 5, 1991
§ 102(e) Date: Sep. 5, 1991

[87] PCT Pub. No.: WO90/04924
PCT Pub. Date: May 17, 1990

[30] Foreign Application Priority Data
Nov. 8, 1988 [FR] France .................. 88 15783

[51] Int. Cl.⁵ .............................................. A22C 13/00
[52] U.S. Cl. ...................................... 452/32; 452/37; 33/544.3
[58] Field of Search ....................... 452/29, 32, 21, 37; 33/501.04, 542, 543, 544, 544.1, 544.2, 544.3; 138/118.1; 426/138

[56] References Cited

U.S. PATENT DOCUMENTS

| | | | |
|---|---|---|---|
| 3,209,398 | 10/1965 | Ziolko | 452/29 |
| 4,228,593 | 10/1980 | Frank et al. | 33/544.3 |
| 4,276,815 | 7/1981 | Peter | 452/32 |
| 4,355,437 | 10/1982 | Wright et al. | 452/29 |
| 4,540,941 | 9/1985 | Walkow | 33/544.2 |
| 4,595,055 | 6/1986 | Vannier | 33/544.3 |
| 4,830,105 | 5/1989 | Petermann | 33/544.3 |
| 4,958,411 | 9/1990 | Stanley | 452/37 |
| 5,007,878 | 4/1991 | Klöpping | 452/21 |

*Primary Examiner*—Willis Little

[57] ABSTRACT

This process involves continuously measuring the size of a portion of intestine by means (3) and commanding by means of a computer (8) the selection of a packaging container or support (7) corresponding to this size. This process also involves measuring by means (4) the length of portions of each size which are packaged in the various containers or supports and stopping the run of the portion being measured when a predetermined packaged length is reached.

14 Claims, 5 Drawing Sheets

PROCESS FOR THE CALIBRATION, LENGTH MEASUREMENT AND PACKAGING OF PORTIONS OF INTESTINE USED IN PORK BUTCHERY AND APPARATUS FOR CARRYING IT OUT

The subject of the present invention is a process for the calibration, length measurement and packaging of portions of intestine used in pork butchery and an apparatus for carrying it out. It is customary, in the pork butchery sector, to use intestines of various animals, such as sheep or pigs, to form casings serving for making sausages or sausagemeat.

The processing of an intestine is divided into several phases:

The first phase involves drawing and cleaning the intestine immediately after the slaughtering of the animal, to avoid any risk of microbial growth and fermentation.

The second phase involves carrying out the scraping of the inner wall of the intestine, that is to say removing a so-called mucous layer from it, and the scraping of the outer part of the intestine which has a protective membrane, in order to preserve only the muscular central part composed of two planes of smooth white fibres.

The third phase involves carrying out the calibration of the intestine as a function of its diameter. In fact, an intestine varies in diameter and quality over its entire length, these two parameters themselves varying with the age, breed, feeding method and rearing system of the animals. The calibration operation is carried out, in a known way, by inflating the intestine with water or air in order to measure its diameter. When water is used, this is displaced 50 cm each time in order to measure the diameter of the various successive portions. When air is used, the intestine is inflated over its entire length, its natural convolutions making it possible to keep it within the operator's field of vision. It is the operator's job to detect the diameter of the intestines and the changes in diameter visually.

To make his analysis easier, the operator can use a gauge consisting, for example, of a sliding calliper. At the same time as he determines the diameter, the operator must eliminate those parts of the intestines which are torn or have holes and must classify the portions of intestine according to various quality criteria in terms of the appearance of the tissue and its strength. As an example, it may be mentioned that the diameter of a sheep's intestine is calibrated by 2 mm, of a pig's small intestine by 2 mm or by 3 mm, depending on the particular country, of a cow's small intestine at by 3 mm and of a pig's or cow's large intestine by 5 mm.

The fourth phase in the processing of the intestine involves packaging the latter according to its size and quality, this packaging in predetermined lengths being carried out in the form of cured, dry or briny hanks or by folding on a support, such as a rigid tube or an elongate support of flexible synthetic material.

These four successive phases in the processing of the intestine are carried out independently of one another and empirically, the quality of the end result being governed essentially by the experience of the particular operator. It is therefore very difficult to obtain a product of constant quality, the curers often complaining that the preparers commit calibration errors.

The object of the present invention is to overcome these disadvantages by providing a process and an apparatus for carrying out this process, making it possible to automate the last two phases in the processing of the intestine, these being the most difficult, by carrying out completely objective measurements ensuring a high uniformity in the sizes of the packaged portions of intestines and an exact length at the packaging stage.

For this purpose, this process involves continuously and successively carrying out the measurement of the diameter of a portion of intestine, the measurement of the length of the latter and then its packaging in one or more containers or on one or more supports corresponding to one or more diameters measured during the calibration operation, the measurement of the length of the portion of intestine being carried out by taking into account the length of the parts of different diameters, with integration of the length of intestine packaged in each container or on each support, in such a way that as the portion of intestine being measured is fed through, it is stopped if the length of the portion of intestine in a container or on a support corresponding to the size of the portion being measured reaches a predetermined value.

Advantageously, when a change of size by a value higher or lower than a predetermined value is detected, this process involves stopping the run of the portion of intestine and then commanding the advance, counter to the path of movement of the portion of intestine, of a container or support corresponding to the new size measured.

This technique is highly advantageous because it ensures an interaction between the measurement of the size of each portion of intestine and the selection of the container or support intended for receiving this portion of intestine. Thus, after the tolerances for a particular size have been displayed, it is possible to be certain that the portions of intestine supplied to a particular container or support correspond correctly to the size adopted for this support.

Moreover, adding a measurement of the length of run of the portions of intestine makes it possible to ensure that an absolutely constant length of portions of intestine is packaged in each container or on each support. Thus, for example, if the portions of intestine are to be stored by being drawn onto an elongate support of flexible synthetic material to form an article of a length of 18 meters, the feeding of the portions of intestine intended to be engaged onto the elongate support in question will stop as soon as a length of 18 meters has been measured.

In an apparatus for carrying out this process, the means for calibrating the portions of intestine consist of a tube, onto which each portion of intestine is intended to be engaged and inside which is mounted a deformable parallelogram consisting of four links articulated about axes transverse relative to the tube, the junction zones between two links of a pair of links being capable of projecting out of the tube through longitudinal slots which the latter possesses, in order to bear against the inner face of the intestine, means being provided to determine the deformation of the parallelogram and consequently the diameter of the portion of intestine to be measured.

Furthermore, the component links of the deformable parallelogram are equipped with rollers of transverse axes which are uniformly distributed over their length and which form members for bearing on the intestine.

Advantageously, two links of the parallelogram bear on an abutment at their adjacent ends, whilst the opposite ends of the other two links are articulated on a rod seated axially inside the tube and associated with elastic means tending to deform the parallelogram in an opening direction, a linear displacement sensor measuring the movements of the rod inside the tube being provided.

According to one characteristic of this apparatus, the latter possesses, downstream of the calibration means, a measuring wheel, with which each portion of intestine to be measured is intended to come in contact and which is equipped with a braking system acting in the absence of a driving of the intestine.

According to another characteristic of the invention, the means for packaging the portions of intestine consist of a turret having an axis parallel to the direction of run of the portions of intestine and carrying a certain number of cannulas which, parallel to the axis of rotation and located at a distance from the latter equal to the distance between the said axis and the axis of movement of the portions of intestine, each correspond to a size of intestine, this turret being associated with means for driving in rotation which are intended to bring into the axis of movement of the intestine a cannula of a size corresponding to that of the portion of intestine running through.

Finally, this apparatus has a computer making it possible to set parameters on the one hand for the sizes or size ranges and on the other hand for the desired metering of each of the cannulas of the turret and which receives information from the calibrating and length-measuring devices and, after the withdrawal of the drive heads, commands the movement of the turret, to bring into the loading position the cannula of a size matching the measured size, and the stopping of the loading of a cannula when the length of the portions of intestine engaged on the latter is equal to a predetermined value.

At all events, the invention will be understood clearly from the following description with reference to the accompanying diagrammatic drawing illustrating an embodiment of this apparatus by way of non-limiting example:

FIG. 4 is a sectional view of the system for measuring the length of the intestine as it is fed through;

Figure 1:
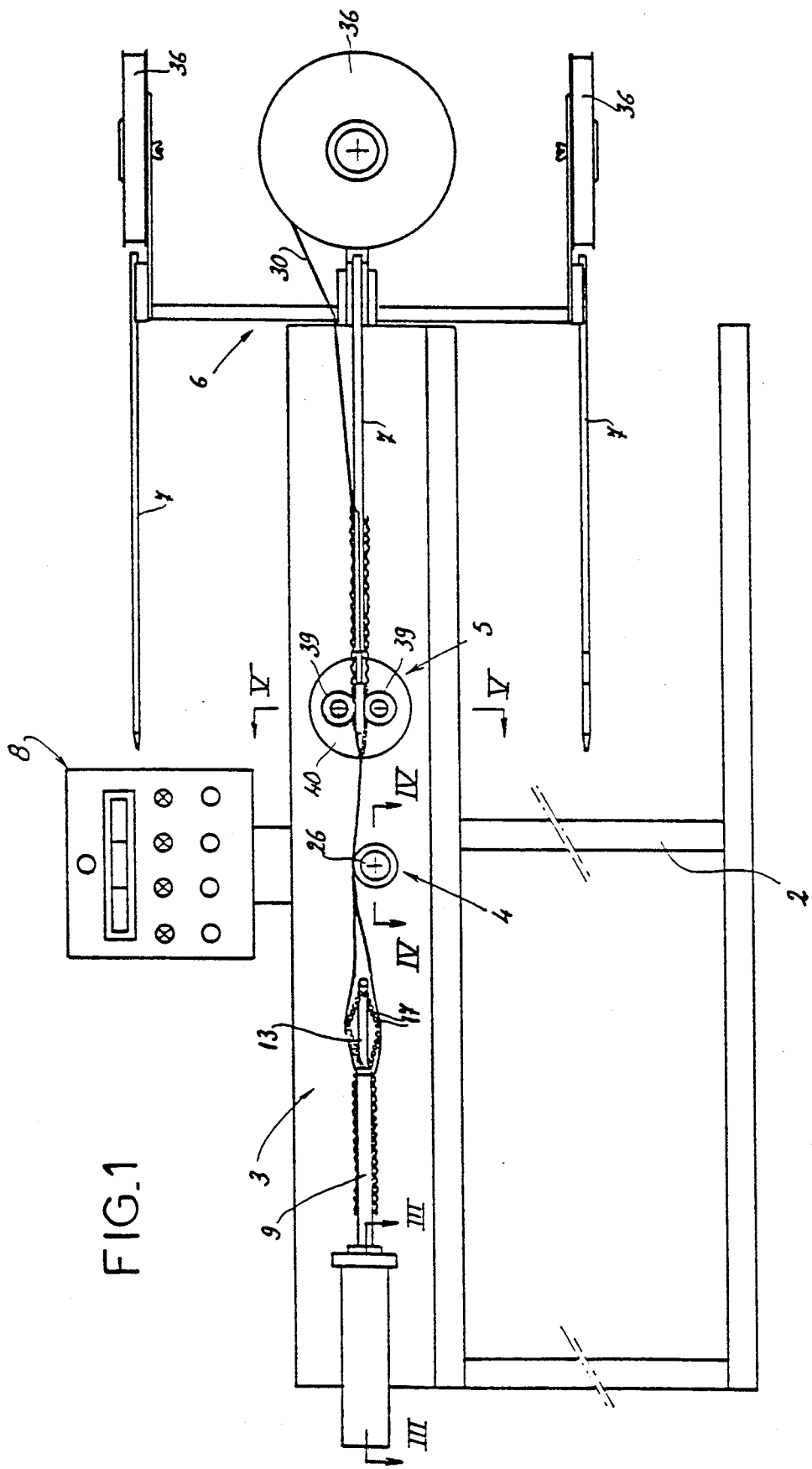
FIG. 1 is a side view of it.

The machine illustrated in FIG. 1 comprises a stand, designated by the reference 2, on which are mounted the various systems making it possible to carry out the process. The reference 3 denotes the calibration system, 4 designates the length-measuring system, 5 designates the drive system, 6 denotes a turret carrying cannulas 7 for packaging the portions of intestine, and 8 denotes a computer for the automatic control of the various movements.

Figure 2:
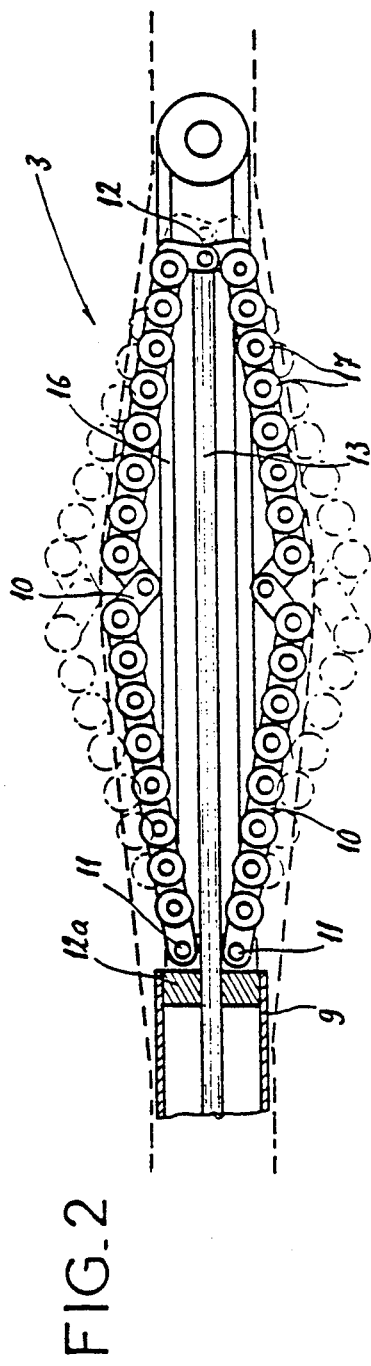
FIG. 2 is a partial view of the calibration system in longitudinal section and on an enlarged scale.
Figure 3:
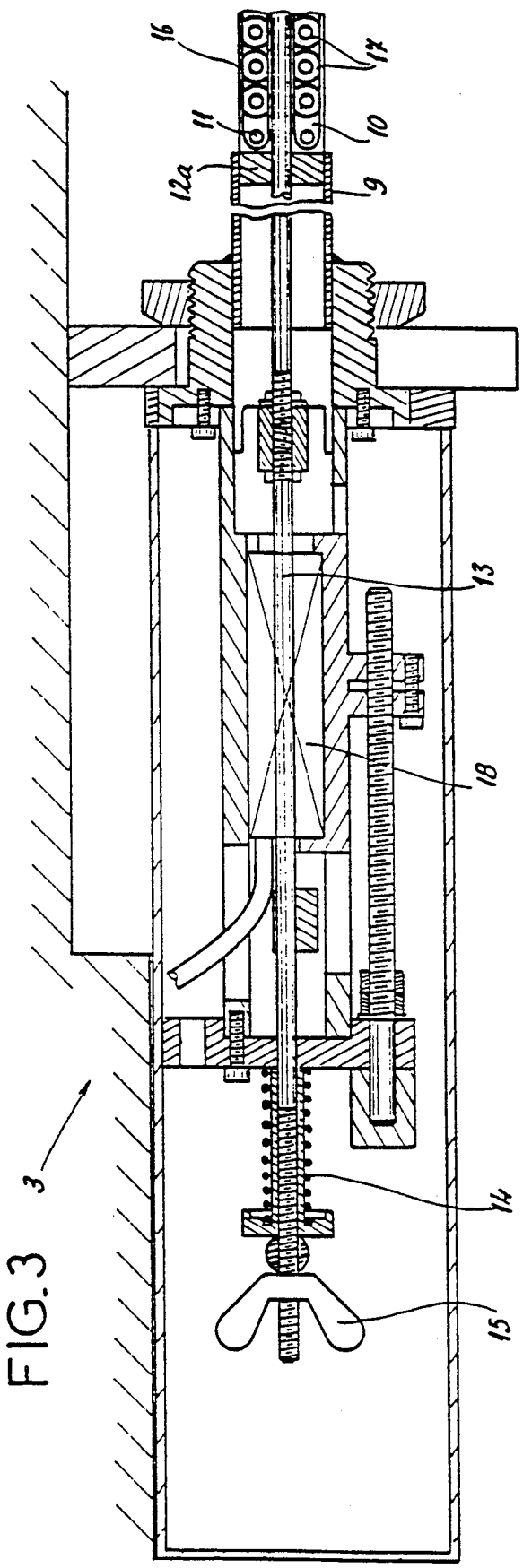
FIG. 3 is a partial view of it in a section taken along the line III—III of FIG. 1.

As shown more particularly in FIGS. 2 and 3, the system 3 for calibrating the portions of intestine comprises a tube 9 which is fastened to the stand and of which the end located on the right in the drawing is free, allowing the engagement of the portions of intestine to be calibrated on the one hand and the removal of these on the other hand.

As shown in FIGS. 2 and 3, the tube 9 serves for receiving four links 10 forming a deformable parallelogram. The two links located on the same side are articulated about an axle 11, whilst the two links located on the same side as the free end of the tube are articulated about an axle 12 at the end of a rod 13 seated axially inside the tube and subjected to an elastic pulling movement adjustable, at its other end, by means of a spring 14 and a lever 15 for adjusting the tension of the spring. This action tends to deform the parallelogram in an opening direction because two links bear against an abutment 12a, the links 10 being capable of passing through slots 16 made for this purpose in the tube 9. The links 10 are equipped with rollers 17 forming members bearing on the inner face of the intestine, without risking damaging the latter, the deformation of the parallelogram being limited as a result of the bearing on the intestine. Because the deformation of the parallelogram is accompanied by a displacement of the rod 13, a check of the movements of the latter makes it possible to follow the change in diameter of the intestine to be calibrated.

As shown in FIG. 3, the means for measuring the movement of the rod 13 consist of a linear displacement sensor designated by the general reference 18.

Figure 4:
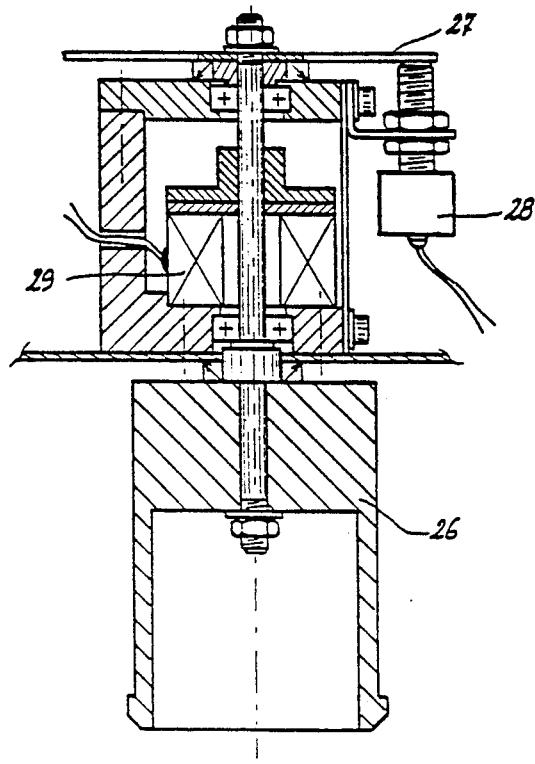

Downstream of the calibration system illustrated in FIGS. 2 and 3 is a system for measuring the length of run of the intestine, which, as shown in FIG. 4, consists of a wheel 26, with which the intestine comes in contact without sliding, to allow it to be driven. Keyed on the shaft carrying the wheel 26 is a disc 27 supplying pulses to a pulse counter 28 at each revolution. Finally, an electromagnetic brake 29 is associated with the shaft carrying the wheel, to ensure that the latter is blocked in terms of rotation as soon as the means for driving the intestine cease to be actuated. The length measurement information supplied by the wheel 26 is transmitted to the computer 8.

In the embodiment illustrated in the drawing, the portions of intestine are intended to be packaged on elongate supports of flexible synthetic material 30, each elongate support being intended, when it is being loaded, to be fastened to a cannula 7 of a turret 6. The various cannulas associated with this turret each correspond to a particular size of intestine. This turret, the movement of which is controlled by the computer, is driven in rotation by means of a motor 32, making it possible to advance counter to the axis of run of the intestine the cannula 7 of a size corresponding to the measured size of the intestine running through.

Figure 6:
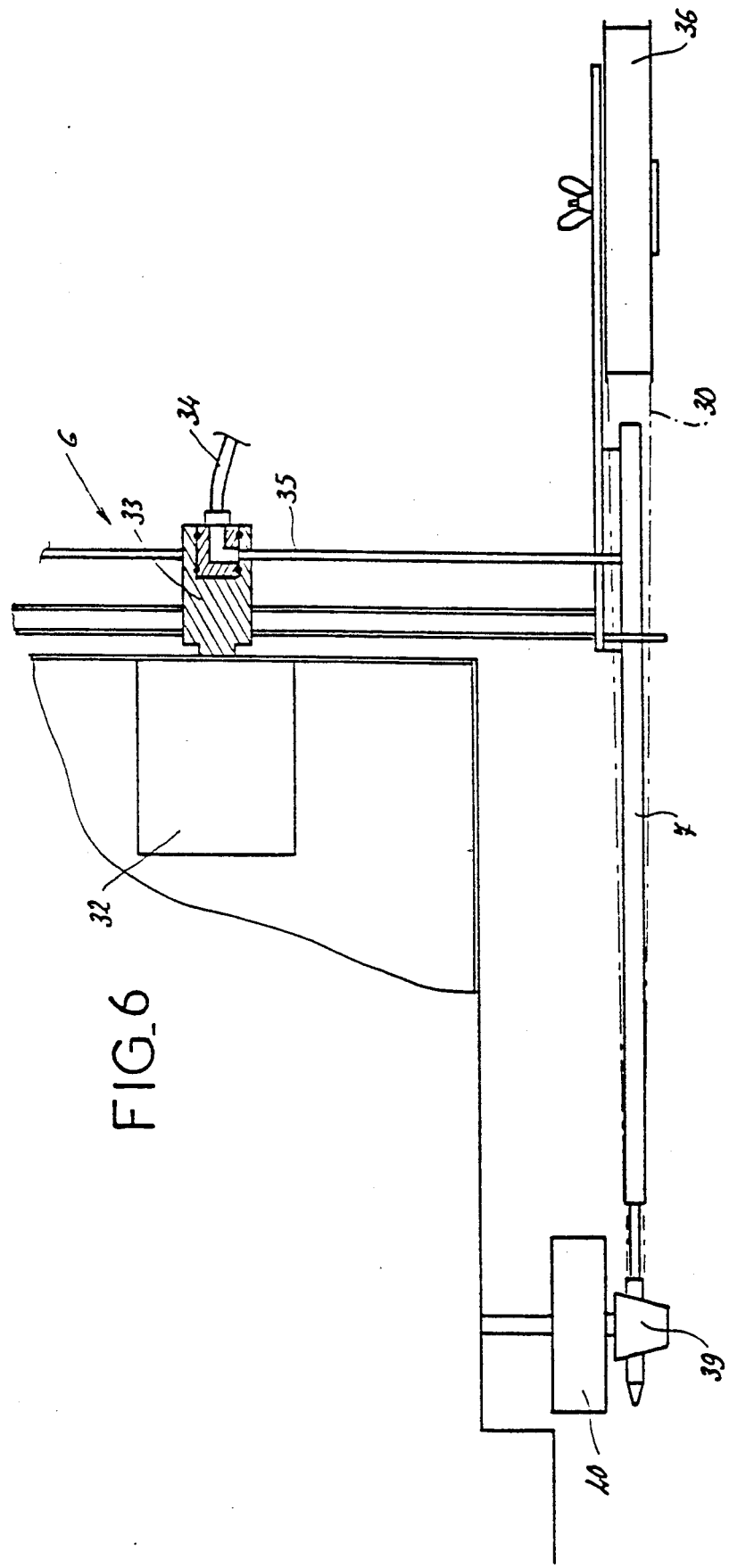
FIG. 6 is a side view of the system for packaging the portions of intestine.

As shown in FIG. 6, the hub 33 of the turret has an axial water feed 34 communicating with a radial outlet 35 oriented in the direction of the cannula 7 being loaded. This arrangement makes it possible, by means of this water feed, to lubricate the cannula being loaded, thus making it easier to fold the portions of intestine onto the latter.

Figure 7:
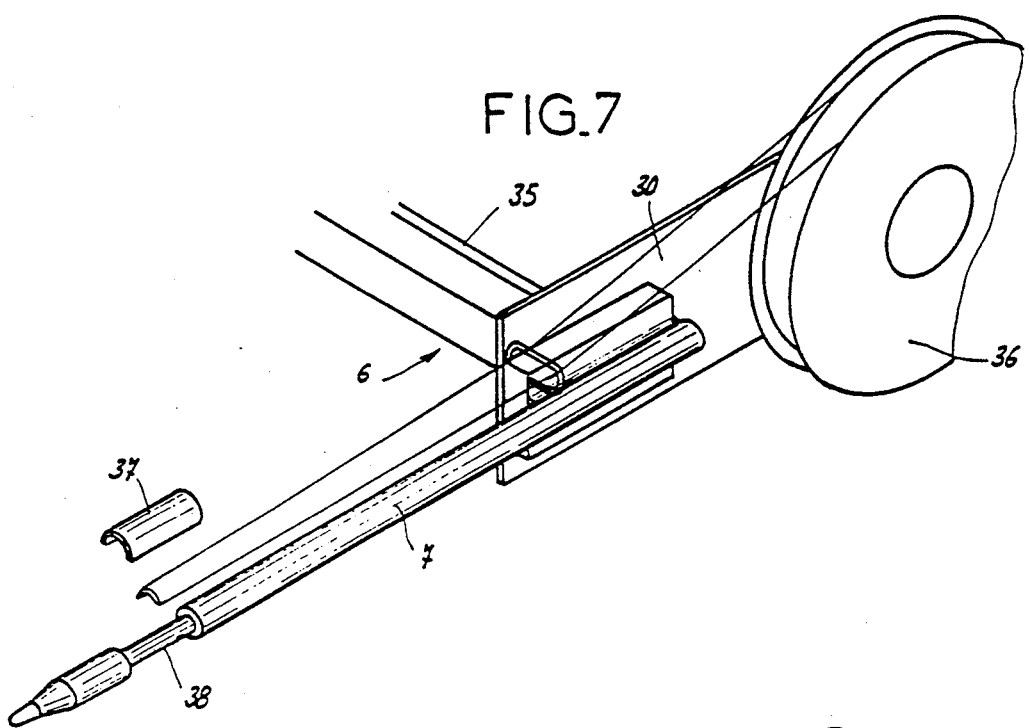
FIGS. 7 and 8 are two perspective views respectively of a cannula intended for receiving the portions of intestine and of an elongate support of flexible synthetic material, after being loaded with portions of intestine.
Figure 8:
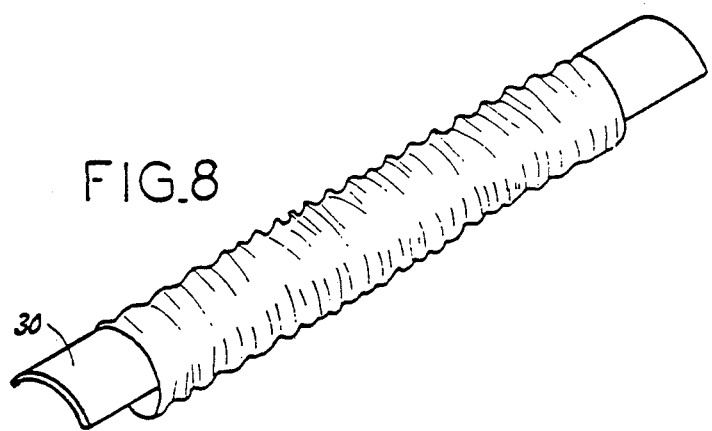
Figure 9:
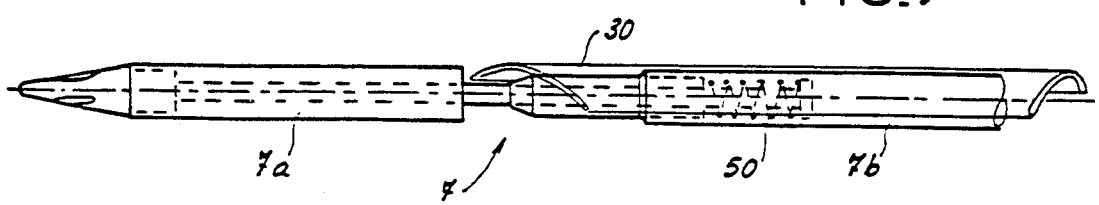
FIGS. 9 and 10 are side views of the cannula.
Figure 10:
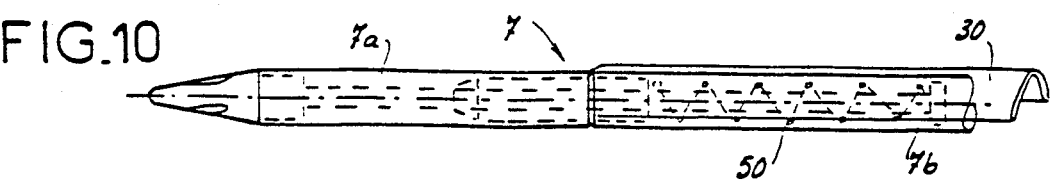

As shown in FIGS. 6 and 7, associated with each cannula 7 is a reel 36 carrying a succession of elongate supports of synthetic material separated from one another by means of precut lines.

As shown in FIG. 7, each elongate support is positioned on a cannula in a flattened position, astride the upper part of the cannula, and is retained by means of a clip 37 intended for gripping the front end of the elongate support within a recess 38 which the said cannula possesses.

Figure 5:
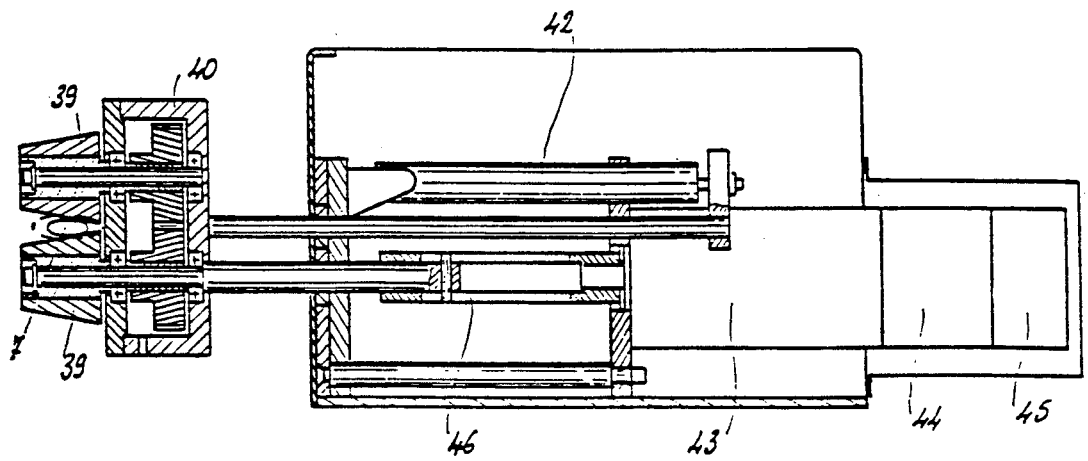
FIG. 5 is a view of the device for driving the intestine in a section taken in a vertical plane, transverse relative to the axis of run of the latter.

The means for driving the intestine in its run through are illustrated in FIG. 5. These means comprise essentially two conical heads 39 which have parallel axes and the smaller cross-section of which faces the opposite way to their support. The support 40 of the two heads 39 is mounted displaceably in a direction parallel to the axis of the heads, this displacement being obtained by means of a jack 42. A motor 43, with which a brake 44 and a tacho-generator 45 are associated, drives the two heads 39 in opposite directions to one another by means of a splined shaft 46. In the working position, the two heads 39 come to bear against the front part of a cannula 7 being loaded and make it possible to bring the intestine onto this. The fact that the heads are conical allows the intestine to be loaded onto cannulas of different cross-sections, that is to say matched to the different sizes. In practice, during the run of the intestine, the heads 39 are in contact with a cannula 7. As soon as the machine stops, in order to place a new cannula in the loading position, the heads retract to allow a free rotation of the turret, before returning to the working position when the cannula corresponding to the new size selected is in the loading position.

This apparatus functions as follows: the operator first starts by loading a portion of intestine onto the calibrating tube 9. After the size measurement, the end of this portion of intestine is brought manually onto the cannula of corresponding size which itself has been equipped with a flexible elongate support. The operator then commands the automatic start-up of the machine. The heads 39 drive the intestine which is folded onto the cannula 7 and onto an elongate support 30 which the latter possesses. The length of the intestine running through is measured continuously by the wheel 26. If the size measured by the system 3 is perfectly uniform, the run continues until the wheel 26 has measured a predetermined length corresponding to the length allowed for the loading of a flexible elongate support which, for example, is 18 meters.

Conversely, if the system 3 detects a change of size, the computer commands the stopping of the drive of the intestine by the heads 39, the braking of the wheel 26 by the brake 29, the withdrawal of the heads 39, and the actuation of the turret in rotation in order to bring, counter to the axis of run of the intestine, a cannula corresponding to the new size measured. The operator cuts the portion of intestine and engages it onto this new cannula and then commands the restarting of the machine.

As emerges from the foregoing, the invention affords a great improvement to the existing technique by providing a process and an apparatus of simple design and structure, making it possible simultaneously to carry out the size measurement, length measurement and packaging of portions of intestine.

It goes without saying that the invention is not limited only to the method of carrying out this process, nor only to the embodiment of the apparatus which are described above by way of example; on the contrary, it embraces all their alternative versions. Thus, in particular, the means for measuring the size of the intestine could be different and could consist, for example, of a pouch which is put under pressure pneumatically or hydraulically and on which the intestine would slide, the diameter of the intestine could be measured by means of a series of photoelectric cells, the means for driving the intestine could be different, the heads being fixed and the cannula being axially displaceable in relation to these, or the packaging means could consist of containers, without thereby departing from the scope of the invention.

I claim:

1. Process for the calibration, length measurement and packaging of portions of intestine used in pork butchery, characterized in that it involves continuously and successively carrying out the measurement of the diameter of a portion of intestine, the measurement of the length of the latter and then its packaging in one or more containers or on one or more supports corresponding to one or more diameters measured during the calibration operation, the measurement of the length of the portion of intestine being carried out by taking into account the length of the parts of different diameters, with integration of the length of intestine packaged in each container or on each support, in such a way that as the portion of intestine being measured is fed through, it is stopped if the length of portions of intestine in a container or on a support corresponding to the size of the portion being measured reaches a predetermined value.

2. Process according to claim 1; characterized in that, when a change of size by a value higher or lower than a predetermined value is detected, it involves stopping the run of the portion of intestine and then commanding the advance, counter to the path of movement of the portion of intestine, of a container or support corresponding to the new size measured.

3. An apparatus for calibrating, length measuring and packaging of portions of intestine used in pork butchery, comprising a calibration means for calibrating portions of intestine, the calibrating means comprising a tube, onto which each portion of intestine is intended to be fitted and inside which is mounted a deformable parallelogram comprised of four links articulated about pins transverse relative to the tube, joining zones between two links of a pair of links being able to project out from the tube through longitudinal slots of the tube and bear against the inner face of the intestine; and determining means for determining the deformation of the parallelogram, the deformation of the parallelogram indicating the diameter of the portion of intestine to be measured.

4. The apparatus according to claim 3, wherein the links of the deformable parallelogram are equipped with traverse pins, uniformly distributed over a length of the links, and rollers, being mounted on the traverse pins for bearing on the intestine.

5. The apparatus according to claim 3, wherein two adjacent ends of two links of the parallelogram bear on a stop while opposite ends of the other two links are articulated on a rod seated axially inside the tube and associated with elastic means tending to deform the parallelogram in an opening direction, and further comprising a linear displacement sensor for measuring movement of the rod inside the tube.

6. The apparatus according to claim 3, wherein, downstream of the calibration means, the apparatus further comprises a measuring wheel, wherein each portion of the intestine to be measured comes in contact with the measuring wheel, said measuring wheel having a braking system acting when the portion of intestine ceases to be driven.

7. The apparatus according to claim 6, further comprising a measuring means for measuring lengths of portions of intestine, comprising a pulse counter for measuring the number of revolutions of the measuring wheel, and wherein the braking system is an electromagnetic braking system.

8. The apparatus according to claim 3, further comprising a means for packaging portions of intestine comprising a turret having a rotation axis parallel to a direction of travel of a said portion of intestine and carrying cannulas, said cannulas being parallel to the rotation axis and located at a distance from the rotation axis equal to a distance between said rotation axis and an axis along which portions of intestine move, each cannula corresponding to one size of intestine, wherein the turret is associated with a rotational driving means for bringing a cannula of a size corresponding to the portion of intestine running through the apparatus into an axis of the direction of travel of the portion of intestine.

9. The apparatus according to claim 8, further comprising a means for driving the intestine comprising two conical heads, at least one said conical head being driven rotationally and arranged on either side of the cannula in the loading position, to bear on the cannula, the two heads being mounted on a support displaceable in a direction parallel to the axis of the heads, the displacement of the support being designed to release the heads from the cannula in the filling position before the turret is set in rotation.

10. The apparatus according to claim 8, wherein the turret is equipped with a central water feed having a radial outlet intended for feeding water only to a said cannula which is in position for accepting the portion of intestine.

11. The apparatus according to claim 8, wherein each cannula further comprises a front end, located on a side bringing up the portion of intestine, and a recess located near said front end for engaging a clip for holding a flexible sheath for packaging the portions of intestine in a flat position and arranged astride an upper end of the cannula to allow the intestine to pass onto the sheath.

12. The apparatus according to claim 8, wherein each cannula further comprises a first part and a second part, displaced axially and normally held in contact by the action of a spring, said first and second parts being displaceable axially against the action of said spring to leave a gap for gripping an end of a flexible sheath designed to receive a portion of intestine.

13. The apparatus according to claim 9, further comprising a computer for setting 1) parameters for the sizes or ranges of the sizes; and 2) a desired metering of each of the cannulas of the turret; said computer receiving information from the calibrating means and measuring means, and after the withdrawal of the conical heads, instructing the turret to move and bring the cannula of a size matching the measured size into a loading position and stopping loading of the cannula when a length of the portion of intestine fitted on the cannula equals a predetermined value.

14. Apparatus for the calibration, length measurement and packaging of portions of intestine used in pork butchery, comprising means for carrying out measurement of a diameter of a portion of intestine, means for carrying out measurement of a length of the portion of intestine and means for packaging the portion of intestine in one or more containers or on one or more supports corresponding to one or more diameters measured during the calibration operation, the measurement of a length of the portion of intestine being carried out by taking into account the length of parts of different diameters, with integration of the length of intestine packaged in each container or on each support, in such a way that the travel of a portion of intestine being measured is stopped if the length of portions of intestine in a container or on a support corresponding to the size of the portion being measured reaches a predetermined value.

* * * * *

UNITED STATES PATENT AND TRADEMARK OFFICE
CERTIFICATE OF CORRECTION

PATENT NO. : 5,217,404

DATED : June 8, 1993

INVENTOR(S) : Christian B. Lanfrey

It is certified that error appears in the above-identified patent and that said Letters Patent is hereby corrected as shown below:

```
On the Title page, item [75]
Change inventor's name to --Christian Billon-Lanfrey--.
```

Signed and Sealed this

First Day of February, 1994

Attest:

BRUCE LEHMAN

Attesting Officer

Commissioner of Patents and Trademarks